Figure 16:
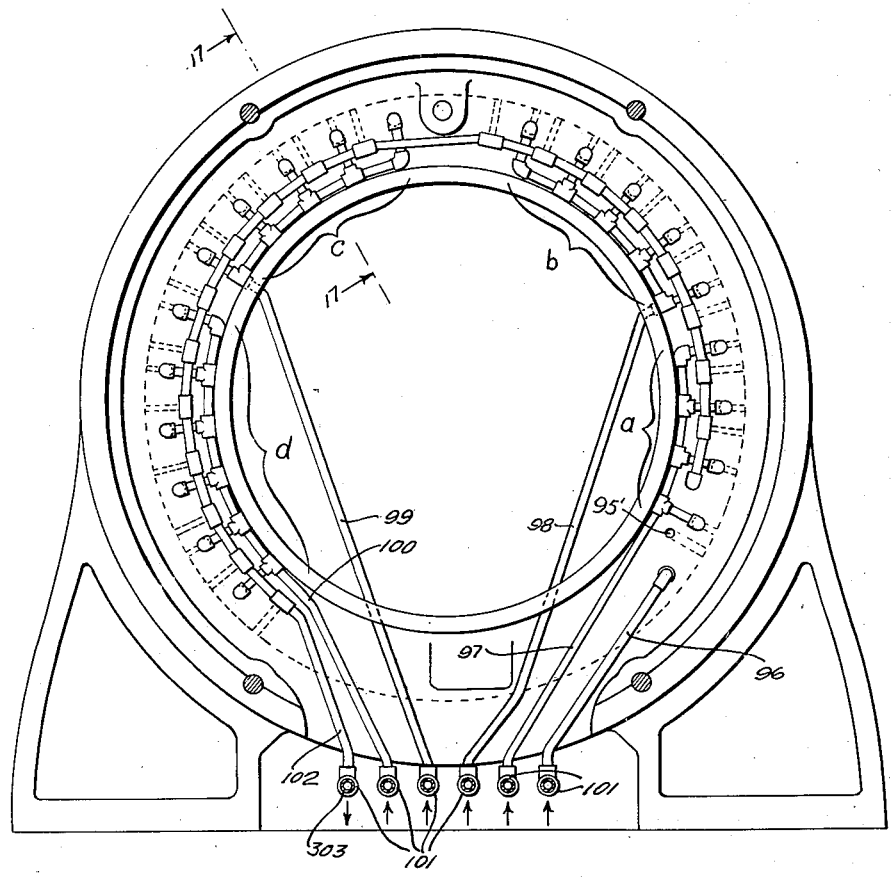

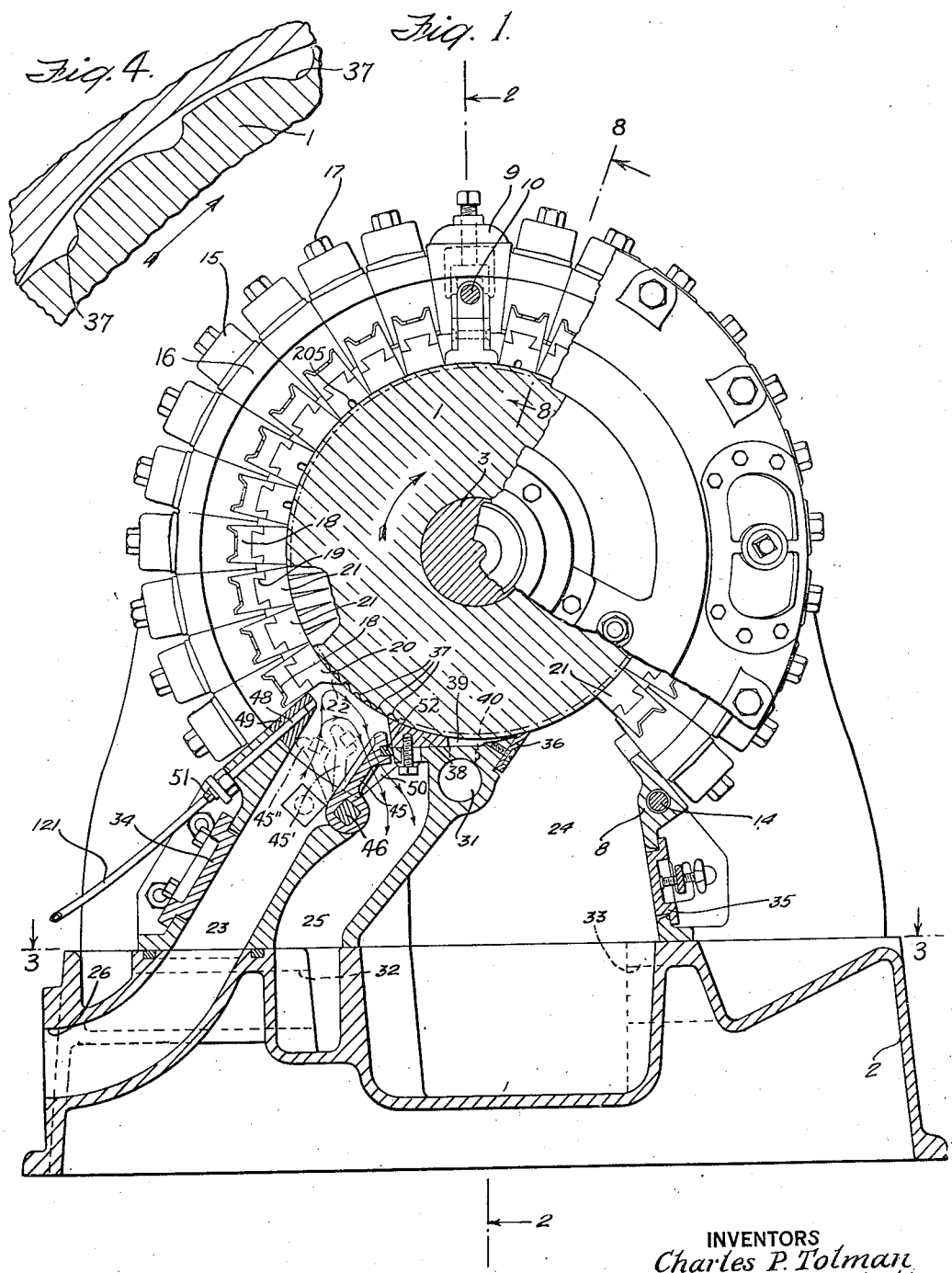

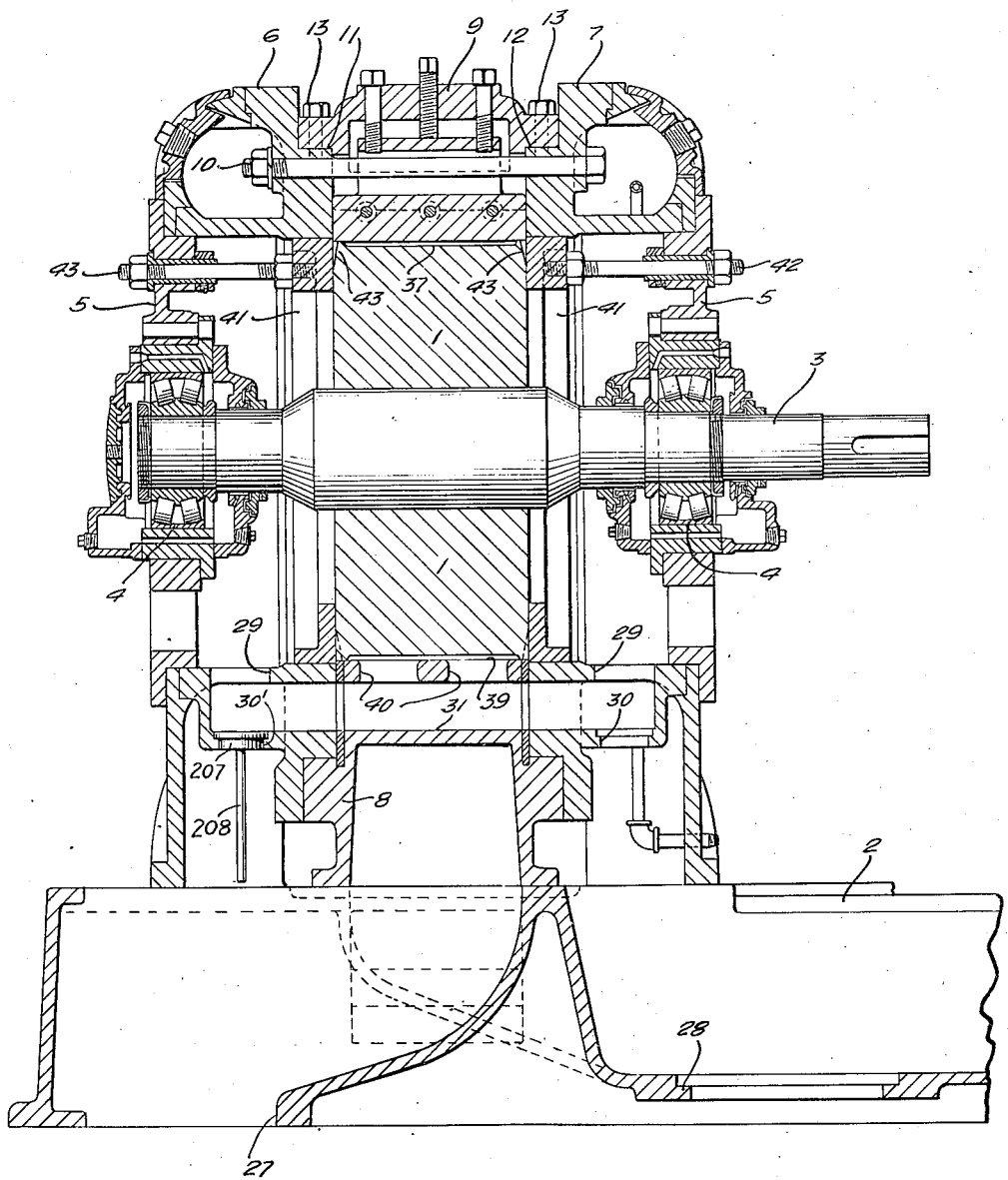

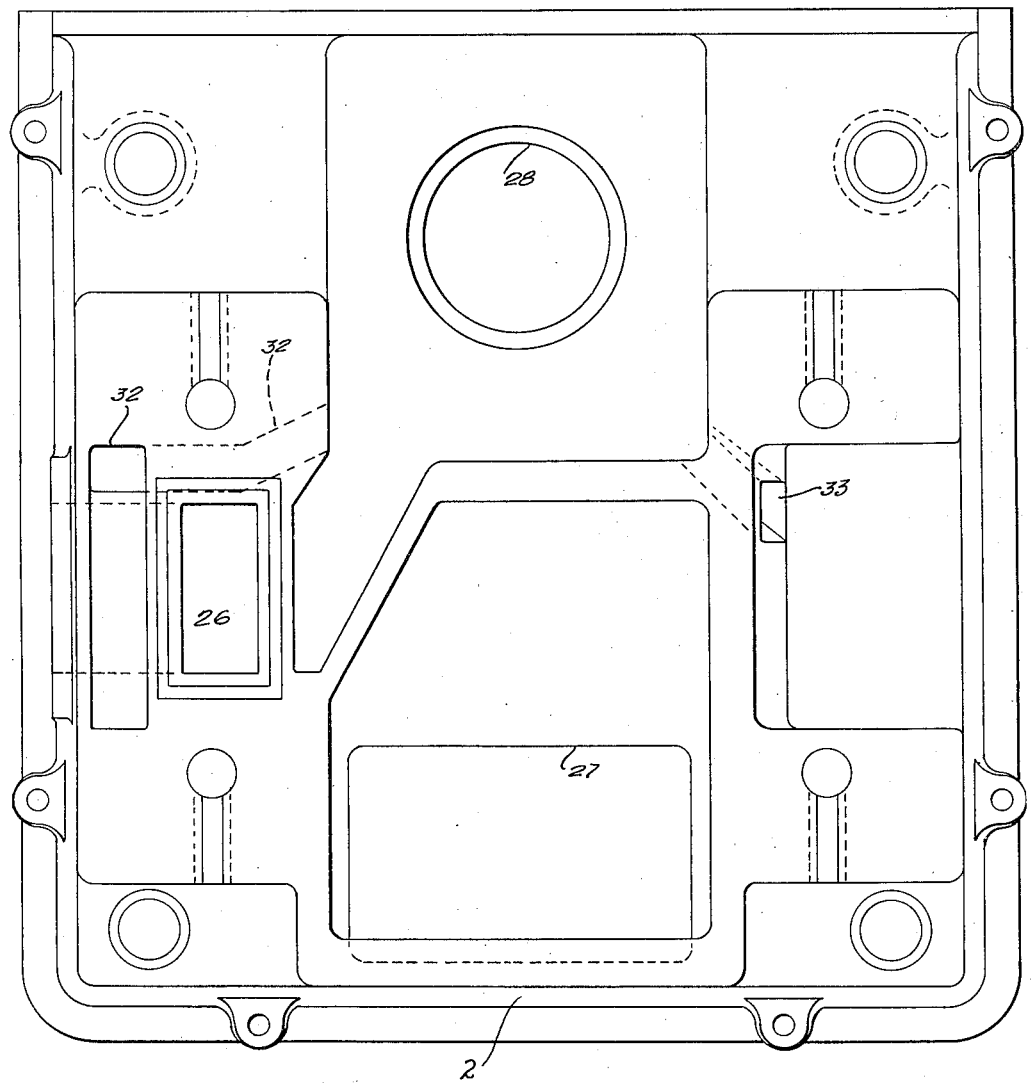

June 2, 1936.   C. P. TOLMAN ET AL   2,042,566
STUFF TREATMENT MACHINE AND JUNK REMOVER
Original Filed March 28, 1934   9 Sheets-Sheet 4
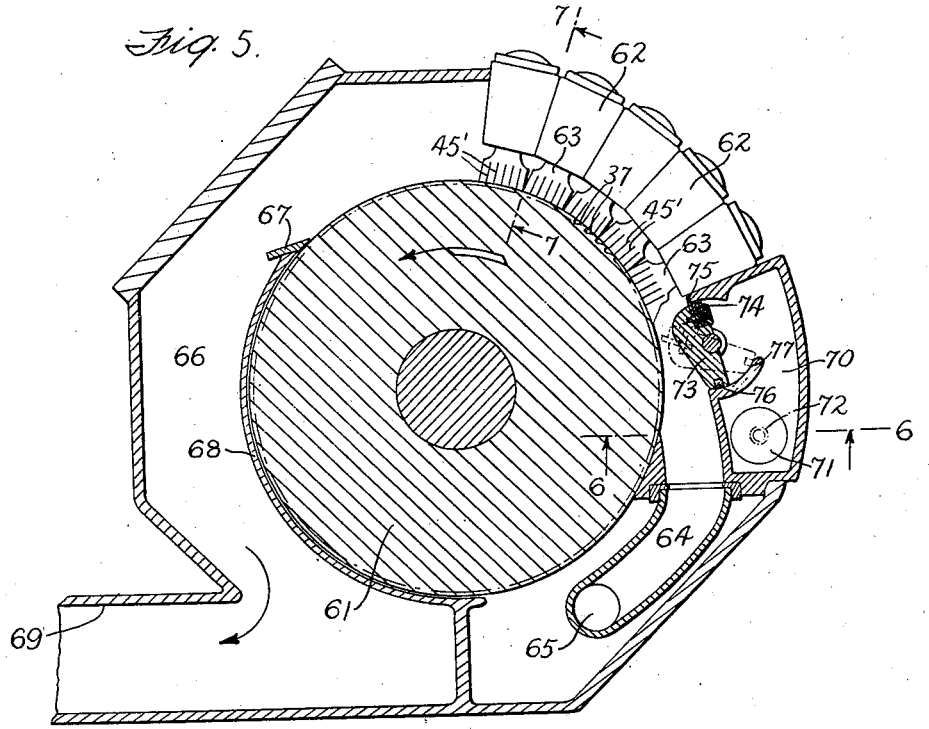
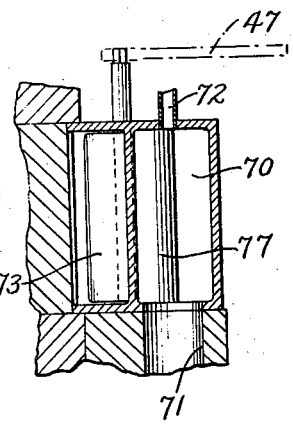
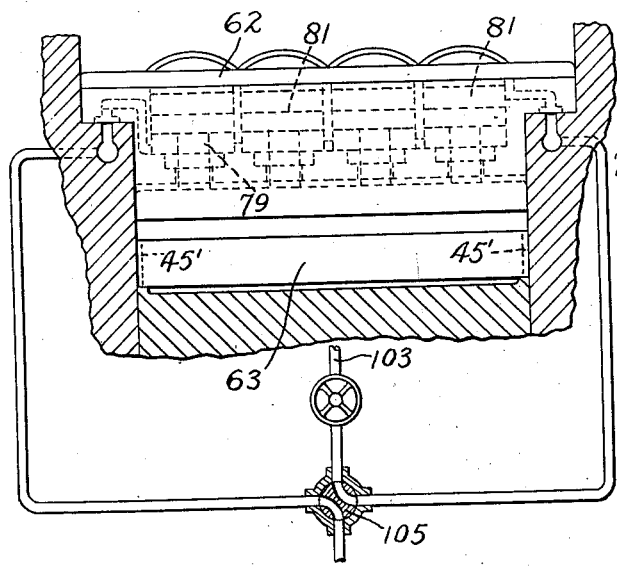
INVENTORS
Charles P. Tolman
BY James T. Coghill
Blair, Curtis & Dunne
ATTORNEYS June 2, 1936.  C. P. TOLMAN ET AL  2,042,566
STUFF TREATMENT MACHINE AND JUNK REMOVER
Original Filed March 28, 1934  9 Sheets-Sheet 5
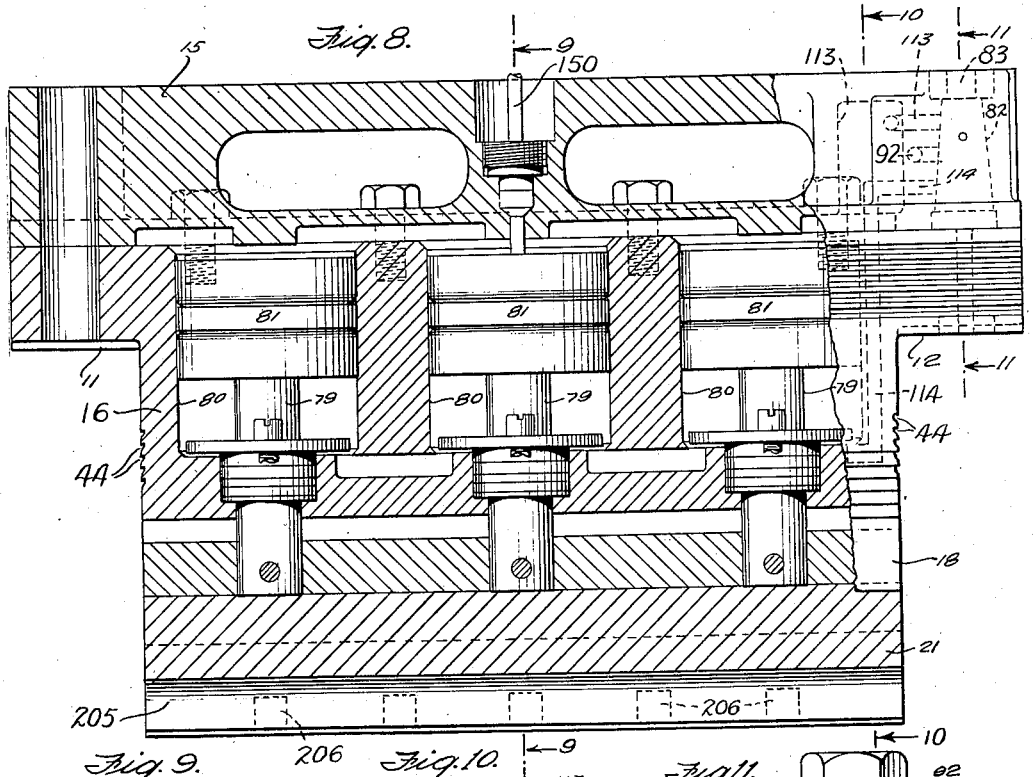
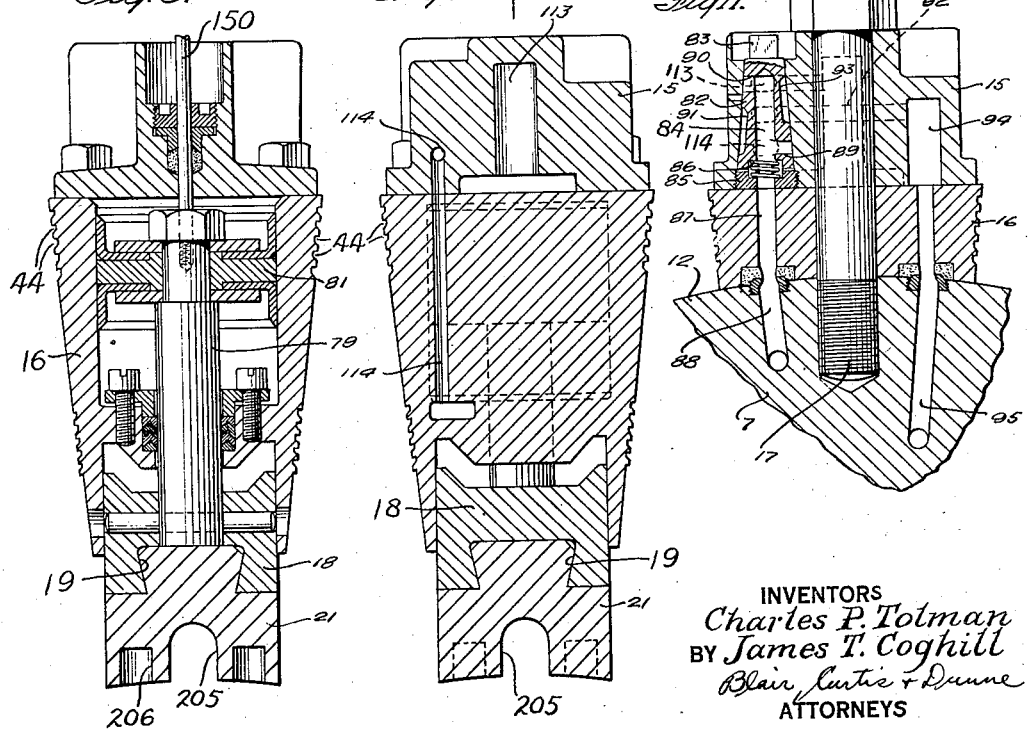
INVENTORS
Charles P. Tolman
BY James T. Coghill
Blair, Curtis + Dunne
ATTORNEYS

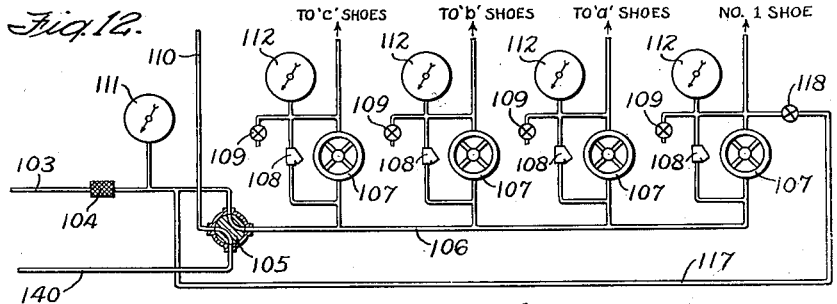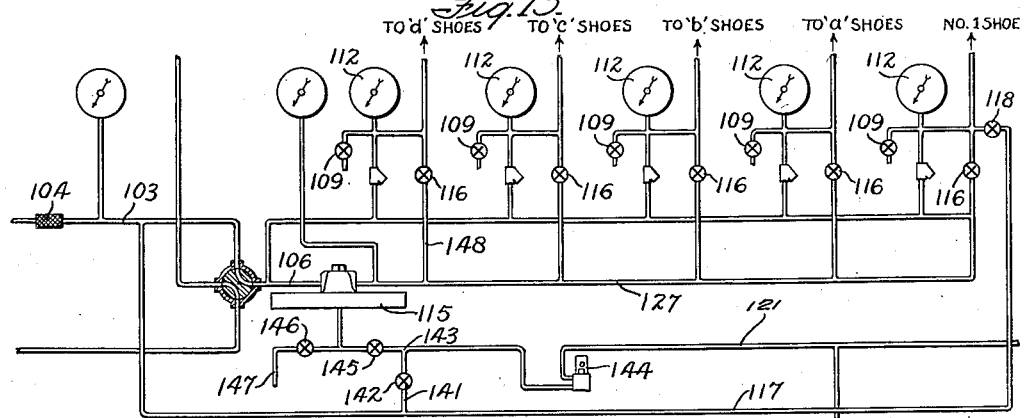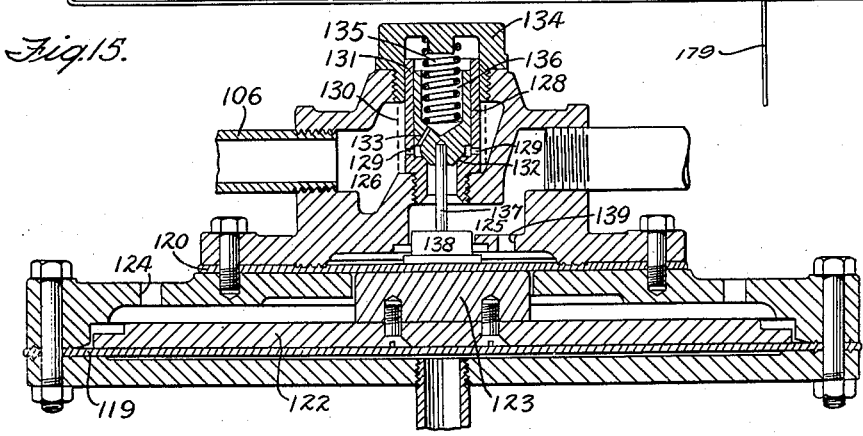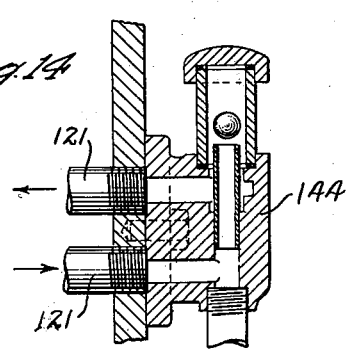

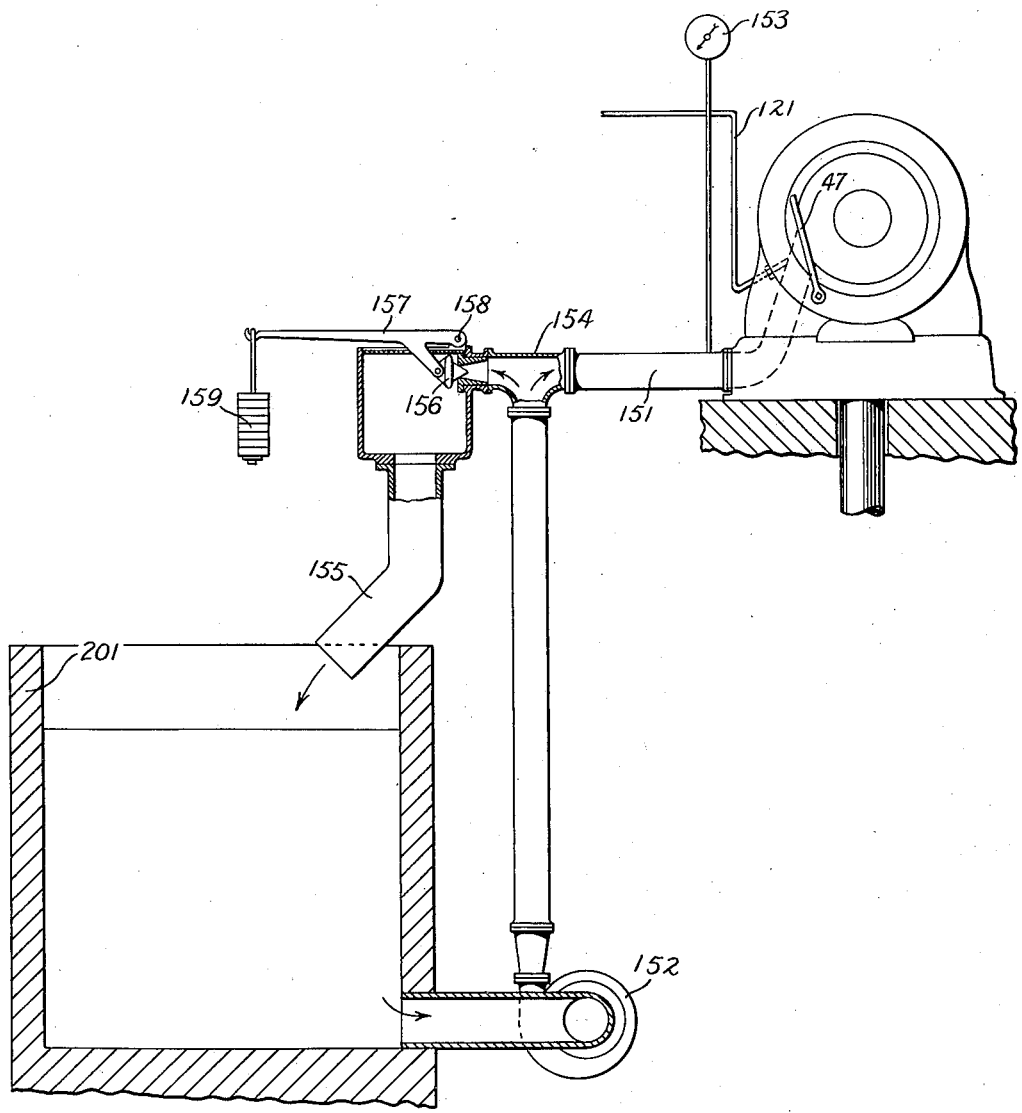

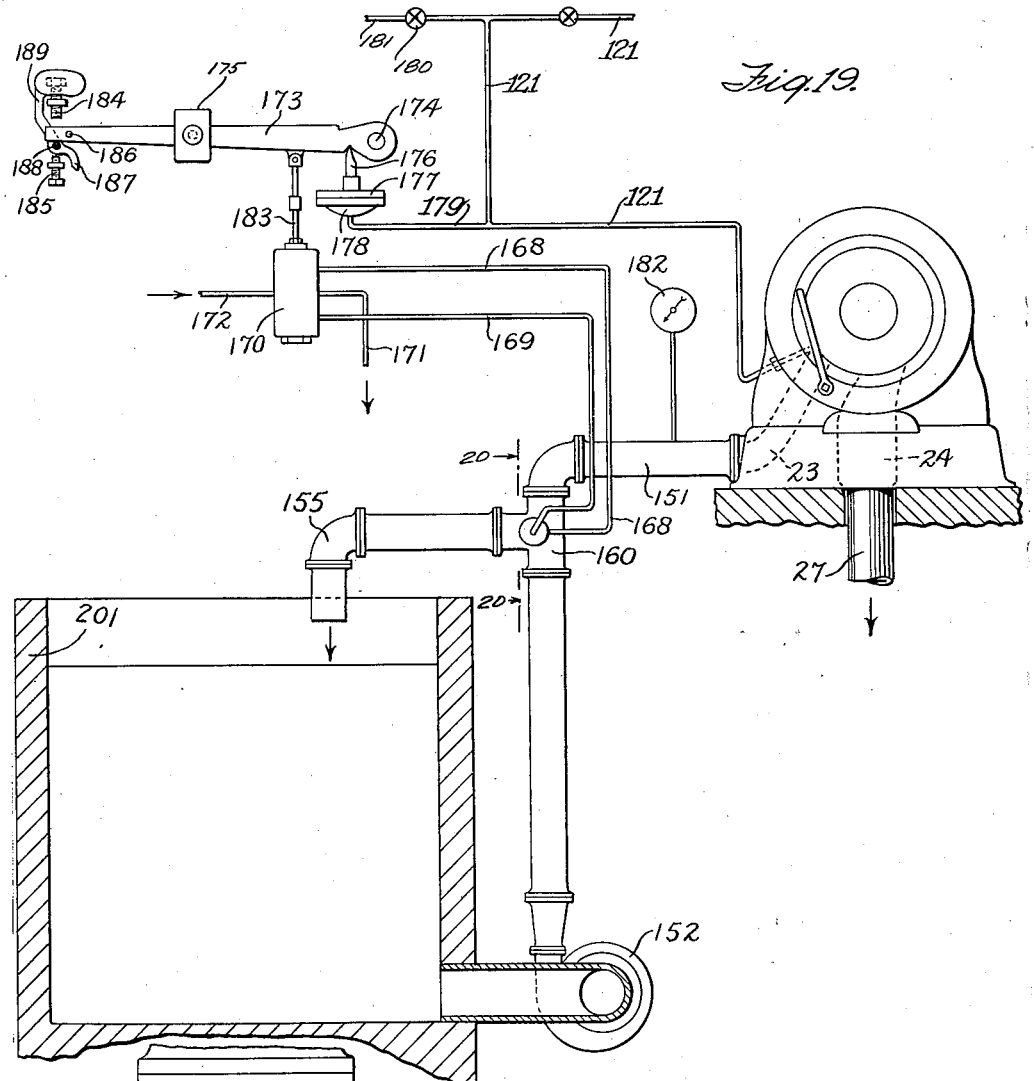
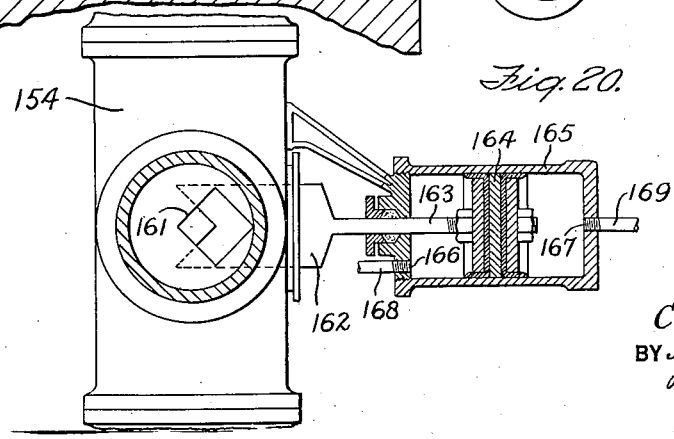

Patented June 2, 1936

2,042,566

UNITED STATES PATENT OFFICE

2,042,566

STUFF TREATMENT MACHINE AND JUNK REMOVER

Charles P. Tolman, Kew Gardens, and James T. Coghill, Hoosick Falls, N. Y., assignors, by mesne assignments, to The Noble & Wood Machine Co., Hoosick Falls, N. Y., a corporation of New York Application March 28, 1934, Serial No. 717,718 Renewed December 14, 1934

47 Claims. (Cl. 92—20)

The present invention relates to an improvement in stuff treatment machines wherein the material to be treated is fed under pressure and passed in fluid form or in a fluid medium through a treating gap or zone. One object among others of our invention has been to provide a machine or mill of the type indicated embodying devices for easily and effectively disposing of foreign objects or materials occurring in the stuff to be treated and not adapted to be passed through the treatment zone. This feature may conveniently be referred to as the trash remover or purging device.

A further object of our invention, as applied to apparatus having a fixed time factor and wherein the extent or degree of treatment of the material or stock at a given rate of throughput is a function of the pressure exerted thereon in the space between the rotor and one or more stators, i. e., the shoe pressure, has been to provide suitable means for automatically controlling said shoe pressure in relation to the feed pressure, that is, the pressure exerted upon the stock in the feed chamber or at the inlet opening of the shearing gap, or treatment zone.

One embodiment of our invention adapted more particularly for the treatment or preparation of paper stock or the like is illustrated in the accompanying drawings attached to and forming a part of the present specification and in which—

Figure 1 is a front end elevation with outer parts thereof removed to disclose interior portions and with other structural features shown in vertical section;

Figure 2, a section on the line 2—2 of Figure 1;

Figure 3, a plan view of the base member upon which the stator and rotor supporting frames are mounted;

Figure 4, a fragmentary detail in section illustrating, on an enlarged scale, the rotor groove and land contours;

Figure 5, a view partly in vertical section of a modified form of mill with a trash discharge device and shoe pressure control devices;

Figure 6, a horizontal section on the line 6—6 of Figure 5;

Figure 7, a side elevation of a form of stator unit and fluid pressure connections thereto employed in the construction shown in Figure 5;

Figure 8, a longitudinal section illustrating interior portions of the removable stator unit in Figure 1, including the controllably adjustable shoe and hand operated control valve;

Figure 9, a vertical section on the line 9—9 of Figure 8;

Figure 10, a section on the line 10—10 of Figure 8;

Figure 11, a section on the line 11—11 of Figure 8;

Figure 12, a diagram illustrating connections between the shoe pressure cylinders, and shoe pressure control devices;

Figure 13, a diagram showing a modified form of shoe pressure control, automatic in operation;

Figure 14, a detail in section showing a form of ball valve in the feed pressure feeler line;

Figure 15, a side view, enlarged and partly in vertical section of details of interior construction of the compensator shown in Figure 13.

Figure 16, a rear elevation of the mill illustrated in Figure 1 with the cover plates removed to show more clearly the piping connections to the rear frame for admitting fluid pressure to the shoe actuating cylinders and for disposing of waste therefrom.

Figure 17:
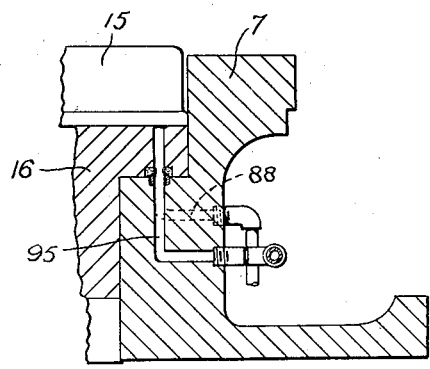

Figure 17, a fragmentary section through the rear frame on the line 17—17 of Figure 16;

Figure 18, a diagram illustrating a form of feed pressure control mechanism applied to a mill;

Figure 19, a diagram showing a modified form of feed pressure control in which the regulating valve is operated positively in response to changes in feed pressure; and Figure 20, a detail in section showing a form of return control valve adapted for use with the apparatus of Figure 19.

In the machine shown in the drawings, a rotor 1, having peripheral grooves 37, is mounted to rotate in the direction of the arrow, Figure 1, in a superstructure supported on a base 2 and is driven through shaft 3 by a motor or other power source, not shown. Shaft 3 is journaled in bearings 4 mounted in spiders 5, one of which is opposite a front frame 6 and the other of which is opposite a rear frame 7, said frames being spaced apart by suitable means, as, at the bottom, by a casting 8 and at the top by a spacer 9. A tie bolt 10 passes through upper portions of both frames and the spacer 9. Another tie bolt 14, Figure 2, passes through lower portions of said frames and through said casting 8.

The inner face of frame 6 forms an annular shoulder 11 and the inner face of frame 7 forms an annular shoulder 12. Bolts 13 secure the spacer 9 in operative position between the frames 6 and 7. As shown in Figure 1, the mill is provided with a plurality of radially arranged stator units removably mounted between frames 6 and 7 and including cylinder caps 15 secured to the shoulders 11 and 12 by bolts 17 passing through end portions of cylinder blocks 16. Each stator unit, Figures 8 to 11 inclusive, also includes a shoe carrier 18 movable in a radial direction toward and from rotor 1 and having a dovetail slot 19 adapted to releasably retain a shoe, as 20 or 21. The shoe 20, hereinafter designated the first shoe, is preferably of suitable metal and fitted with a projecting nose 22. The shoes 21 may be made of wood, metal or other suitable material, depending on the conditions of use.

The working faces of the shoes may be continuous or plain, Figure 5, for some purposes, or, as shown in Figure 1 and Figures 8 to 11, may be provided with grooves 205 and/or recesses 206 as small drill holes. It has been found that with the grooved and/or recessed shoe a greater amount of power can be effectively applied to the same character of stock under treatment.

In the space between the first shoe 20 and the last shoe 21, suitably formed castings provide a feed inlet chamber or passage 23, a stock discharge or outlet passage or chamber 24, and a trash discharge passage or chamber 25. The inlet chamber 23 communicates with a feed inlet opening 26 at one side of the base 2 and, as shown in Figures 2 and 3, the discharge chamber 24 communicates with a discharge opening 27 near the front end of the base. A drain opening 28, in base 2, connects with the trash discharge passage 25 and also receives waste or leakage through seal ring drain passages 29, 30, 31, Figure 2, and other drain passages 32 and 33, Figures 1 and 3. A removable cover 34 closes an opening into the feed inlet chamber 23 and a removable cover 35 closes an opening into the discharge passage or chamber 24. A doctor bar 36 extends across said chamber opposite the last shoe 21 and is adjustable toward and from the rotor periphery. Another transverse bar 38 is mounted in the feed chamber 23 opposite the first shoe 20 and is adjustable toward and from the rotor periphery. A small chamber 39 between said bars 36 and 38 connects with the drain passage 31 through openings or ducts 40.

The drain passage 31' connects with the stock discharge chamber and opening 27 so that, under some circumstances, leakage stock may be carried into the finished stock. A removable plug 207 having a handle 208 is seated in the drain passage 30' when it is desired to route the leakage material to drain 28 through passage 30. By opening passage 30' and closing passage 30 by means of plug 207, the leakage material runs into the stock discharge chamber.

As indicated more clearly in Figure 2, seal rings 41 are held in position by adjusting bolts 42 opposite peripheral edge portions of rotor 1 which are provided with radial grooves 43. During rapid rotation of the rotor 1 counter-pressure develops in grooves 43 to oppose leakage from the rotor ends without the use of packing or of frictional contact between the rotor and rings 41.

As seen more clearly in Figures 9, 10 and 11, undercut grooves 44 are provided in the sides and ends of stator cylinder blocks 15 which, by intercepting solid particles, bring about the formation of leak opposing barriers between the contiguous surfaces of said blocks and between the ends of the blocks and adjacent surfaces of the front and rear frames. Vertically disposed grooves 44' in the ends of shoes 63, Figure 5, perform a similar function.

In normal operation of a mill of the type thus far described, and which forms in part the subject matter of a co-pending application of Charle P. Tolman, Serial No. 717,717, filed March 28th, 1934 the furnish or material for treatment, where it comprises up to 10% of wood pulp in water for example, is forced in a continuous supply under suitable pressure through inlet opening 26 and feed chamber 23 into contact with the grooved periphery of rotor 1 which, in a preferred embodiment, attains a peripheral speed of about 12000 ft. per minute. Particles of suitable size are forced by the feed pressure into the peripheral grooves 37 each of which, in the mill as shown in Figures 1 and 5 is around ⅜th inch wide, decreasing in depth rearwardly from a maximum of approximately .08 inch near its leading edge to the land between its rear edge and the next groove and defining a substantially streamline contour of the leading face of the land which produces a combined scouring and wiping effect in operation. It will be understood that these dimensions and the shape of the grooves may be varied to meet different conditions of use. During rotation, each groove of the rotor, as it passes the feed chamber 23, picks up a small amount of pulp, depending on the amount of the feed pressure, which therefor determines the mill's capacity or rate of throughput, and carries it into the treatment zone or shearing gap where it is subjected to the intended treatment, provided the material presented is of suitable size to pass the inlet opening to said zone. In respect to any given kind of stuff, the insufficiently reduced particles and foreign objects such as pieces of wire, gravel, glass, etc. and other trash therein accumulate against or adjacent to the front face of shoe 20 and, unless removed, eventually obstruct the supply of stock to the treatment zone.

According to our invention, a suitably controllable gate or valve 45, Figure 1, mounted on a shaft 46, is interposed in an opening between the feed chamber 23 and the trash chamber 25. One end of said shaft 46 extends through a front wall of the machine and, in a hand operated embodiment, carries an operating lever 47, Figure 18. As the gate 45 is rocked rearwardly against the incoming supply of material the effective cross sectional area of chamber 23 is constricted, thus producing a correspondingly increased velocity of the stuff stream which now scours past the shoe nose 22 dislodging the trash accumulation and discharging it freely into the trash chamber 25. This purging or cleaning effect may be aided by flushing with water through a nozzle or nozzles suitably positioned, as adjacent to the nozzle 48 at the end of pipe 121, for example, across the face of shoe 20 and nose 22, said nozzle or nozzles being mounted in and extending through a block 49 carrying side plates 50, the inner edges of which are brought close to the rotor by manipulating adjusting screws 51 and when so positioned, oppose leakage of stock from the feed chamber. The gate 45 carries a suitable flexible contact strip 52 of rubber, rubberized fabric or the like, to provide an effective closure across the end of said gate and to prevent injury to the parts in case the gate is closed against a rigid foreign object or substance. The arrows and direction lines in Figure 1 indicate the course of the stuff stream when the gate is in its intermediate partly open position, suggested by dotted lines 45'. Where the gate is retracted to dotted line position 45" the feed stream is substantially shut off and the purging or cleaning out of trash may be completed by flushing with water if necessary or desired.

In the modified form of mill shown in Figure 5 and disclosed in Charles P. Tolman's co-pending application aforesaid, a peripherally grooved rotor 61 is mounted in treatment zone or shearing gap forming relation to individually adjustable stators 62 provided with removable shoes 63. A suitably shaped casting provides a stuff inlet chamber 64 having a lateral inlet opening 65. Material to be treated, i. e. pulp, is fed into said chamber under suitable pressure, and subjected to treatment in the shearing gap or between the rotor periphery and the shoes 63. The finished stock is discharged into chamber 66, portions thereof being guided by a doctor 67 supported at the end of a doctor plate 68. A discharge opening or delivery spout 69 receives and discharges the treated product from the mill.

As applied to the preparation, refining or finishing of fibrous cellulose material in paper and board manufacture, apparatus of the types shown in Figures 1 to 5 inclusive, when operated in connection with suitable methods, provides a stock refining action which produces a high degree of "wetting" in relation to the amount of "cutting". For practical purposes, it may be said that the apparatus produces wetting without cutting, the reduction in fiber length being so small as to be negligible. In this respect said apparatus is free from the operating limitations inherent in machines of the Hollander and Jordan types and others in which increased "wetting" effect is always accompanied by increased cutting.

As in the case of the mill first described, Figures 1 to 3, trash usually accumulates in the feed box adjacent to the rotor during operation of the apparatus shown in Figure 5. Clean out or purging means for this waste material include a trash discharge chamber 70 having an outlet 71 at one side, Figure 6, and a water inlet 72 at the opposite side. A valve or gate 73 is pivotally mounted in a suitable opening between stock inlet chamber 64 and trash discharge chamber 70, said gate having a flexible edge piece 74, as of rubber or rubberized fabric, which bears against a shoulder 75 when valve 73 is in closed position. A packing strip 76 extends across the opposite edge of valve 73 and opposes leakage past said edge and the adjacent curved wall 77. Suitable means such as the hand operated lever 47, Figure 6, may be employed to actuate valve 73. However, when valve 73 is moved toward open or dotted line position, Figure 5, the scouring effect of the stuff stream is initially confluent with the direction of rotation of rotor 61 and the obstructing matter is dislodged and discharged into chamber 70 from which it is flushed out by water jet 72 through said trash discharge outlet 71.

As applied to paper making and the like, the purging apparatus of our invention not only makes practical the use of continuously operating defibering, fibrillating or wetting machines for example, but also protects said machines and the quality of the ultimate board or paper product. In box board manufacture, substantial economies are effected by eliminating a considerable part of the hand sorting and cleaning of the raw waste stock. These advantages are of course additional to the novel and effective stuff finishing capabilities of the mill and the wide range of control which it affords over the extent and character of stuff treatment.

To achieve effective control over the character and/or extent of treatment of the stuff fed to the mill, each shoe carrier 18 is mounted at the ends of rods 79 of pistons 81 operating in cylinders 80 of the cylinder block 16, Figures 7 to 11 inclusive, and means are provided to controllably move said pistons and therefore the shoes 21 toward and away from the treatment zone or gap.

One kind of treatment zone pressure control also disclosed in said co-pending application of Charles P. Tolman, Serial No. 717,717 filed March 23, 1934 involves manual operation of fluid pressure means for raising and lowering either all together, or in groups, or each shoe individually and independently of the others, Figures 7 and 12. Another kind of control forming in part the subject matter of our present invention involves operation of fluid pressure shoe raising and lowering means automatically in response to pressure variations in the feed chamber 23, and may affect all or any group or groups of the shoes either in the same or in different degrees, Figure 13. This feature is particularly useful in a multiple shoe machine where hand adjustment of shoe pressure in response to feed pressure variations, indicated on a pressure gauge, for example, might under many circumstances be inadequate. However, for a single shoe machine, or in a mill having a moderate number of shoes, the hand control by reference to gauge indicated feed pressure variations is satisfactory under suitable conditions.

In the treatment of sulphite pulp, for example, this being one of many uses for which a mill embodying our improvements may be employed, feed pressures of from 5 to 35 pounds have been used with hydraulic pressures of from 30 to 100 pounds per square inch applied to the shoes through the pistons and thence to the stuff under treatment in the treatment zone, these figures being illustrative and in no sense intended as limitations.

For hand control of shoe pressure by hydraulic or other suitable fluid pressure means, a valve is provided to control the admission of fluid under pressure to one side or the other of pistons 81, one of which is preferably provided with a telltale in the form of a rod 150 indicating by its up or down position whether or not the shoe is up or down in relation to the rotor. In the form of device shown in Figures 8 to 11 inclusive, such a valve for actuating a single shoe is conveniently located in the cap 15 and comprises a truncated conical cock 82 having an exposed end 83 shaped to fit a suitable socket wrench.

A longitudinal passageway 84 extends through a retaining nut 85 which bears against a spring 86 interposed between said nut and the bottom face of the cock 82. A fluid inlet or pressure supply duct 87 in the cylinder block connects with a duct 88 opening through the annular surface of shoulder 12 of rear frame 7. A port 89 in cock 82 is positioned to communicate with a passage 114 leading to the lower side of piston 81 and another port 90 communicates with a passage 113 leading to the upper side of said piston, depending on the position of rotation of said cock 82. A lateral recess 91 is positioned therein to communicate with a relief or bleed duct 92 in cap 15 when port 89 is turned to operative pressure admitting position while a similar lateral recess 93 performs a similar service when inlet duct 90 is in operative pressure admitting position. With the parts positioned as shown in Figure 11, both inlets are inoperative and no pressure is in the cylinders 80. The relief duct 92 communicates with a relief duct 94 which extends through cap 15 and block 16 into a relief outlet 95 opening through the annular face of shoulder 12 of rear frame 7. Fluid, as water under suitable pressure is supplied to the respective pressure supply ducts 88 by the supply pipes 96, 97, 98, 99 or 100, Figure 10, each controlled by a suitable hand valve, as 101. The relief outlets 95 connect with a waste pipe 102 having a valve 303, excepting that outlet 95' of shoe 29, the first shoe, vents freely into the space between the rear frame 7 and rear cover plates, not identified. Pipe 96 supplies fluid pressure to the first shoe 20; pipe 97 to the a group of shoes; pipe 98 to the b group of shoes, pipe 99 to the c group; and pipe 100 to the d group, Figure 16.

Under some conditions of use, as where the shoe position and the shoe pressure are controlled entirely by hand operation of valve or cock 82 for single shoes, or by a four way valve 105, Figure 7, the pressure supply pipes aforesaid, or their equivalent, are connected with a common main or otherwise supplied with fluid at suitable pressure. Where automatic control of single shoes or groups of shoes is required and provision is made for applying different pressures to different shoes or groups of shoes, as in a multiple shoe machine, said supply pipes will preferably connect directly or indirectly with a main, each through a suitable and separate pressure regulating mechanism, such for example as those shown in Figures 12 and 13.

As shown in Figure 12, water or other suitable fluid under pressure is supplied from main 103 through a strainer 104 to a four way reversing valve 105. With said valve arranged as shown, i. e. to supply pressure to the several pipes 96, 97, etc., a supply pipe 106 connects with each of the supply pipes of the several shoes or groups of shoes through a manually adjustable pressure regulating valve, as 107, which is by-passed by a pipe containing a one way valve 108. A trickle valve 109 connects with the by-pass pipe. In operation, the fluid, as water under pressure, passes regulating valve 107 and while moving pistons 81 into down position for example, and while holding them in said position, vents through pipes 102 and 110, and valve 105 into waste discharge 140.

Where the regulators 107 are set for different pressures, correspondingly different degrees of shoe pressure will be produced as between different shoes or groups of shoes. To release pressure from all the shoes affected by the condition just described, valve 105 is turned to "off" position whereupon pipe 110 becomes the supply pipe and pipe 106 the return or relief pipe receiving the vented fluid through the one way by-pass valves 108. A gauge 111 discloses the pressure in main 103 and the several gauges 112 disclose pressures in each of the lines connecting with pipe 106.

A suitable arrangement of devices according to our invention for automatic shoe pressure control in response to variations in feed pressure as distinguished, for example, from the manual control disclosed in Tolman's co-pending application aforesaid, is shown in Figure 13. In this case, an automatic regulator or compensator 115 is positioned in the line 106. Interchangeably with or instead of the manually adjustable pressure regulators 107, needle valves 116 may be used, since the compensator supplies regulated pressure. By suitably throttling the needle valves 116 and adjusting the trickle valve or dribble vents 109, any desired shoe actuating pressure may be obtained in the several supply pipes to the shoes.

Provision is made for a separate independent water or pressure inlet to the first shoe 20 by a pipe 117 communicating directly with the main 103 and having a hand throttle valve 118. This arrangement permits the first shoe, which is preferably of metal for some uses, to be "burned into" the rotor, i. e., to have its working surface accurately ground to the rotor contour as a part of the first "tuning up" without, at the same time, applying pressure to the remaining shoes. In subsequent operations, valve 118 remains closed.

Details of construction of the compensator 115 are shown in Figure 15. The casing sections connected by suitable bolts support a large diaphragm 119 and a small diaphragm 120. Water under a pressure value which continuously reflects that of the pressure in stuff feed inlet chamber 23 through feeler nozzle 48 and a feeler pipe 121 connecting therewith is admitted freely to the under side of diaphragm 119. An increase in feed pressure from zero, or other predetermined minimum, displaces the diaphragm 119 and plate 122 upwardly so that an extension 123 of said plate bears upwardly against the underside of diaphragm 120. A vent 124 releases air from the chamber above diaphragm 119. The space above the upper side of small diaphragm 120 is in free communication with the discharge side or chamber 125 of valve housing which has an inlet chamber 126, the latter being connected to pipe 106 and the discharge side being connected to pipe 127, Figure 13.

A hollow valve seat member 128 is threaded in the partition between the valve chambers 126 and 125 and is provided with inlet ducts 129 protected by a suitable screen or filter 130. A hollow valve piston 131 has a tapered end portion which seats upon a tapered shoulder 132 of said seat member 128 and a duct 133 permits equalization of pressure between the inside or recess 136 of said piston 131 and chamber 126. A body cap 134 is screw threaded in the valve casing and retains a spring 135 in operative position with its inner end bearing against a portion of the bottom of recess 136 in said piston 131 to normally hold the lower end thereof in seating engagement with tapered shoulder 132.

A stem 137 having its upper end engaging a recess in the lower end of piston 131, is interposed between said piston and a short plunger 138 mounted for vertical sliding movement in a suitably shaped opening in the valve casing between the outlet chamber 125 and the space above small diaphragm 120. A duct 139 also opens through the same portion of the casing and permits equalization of pressure on the top and bottom ends of plunger 138.

In the specific example illustrated in the drawings, the compensator is calibrated to continuously regulate the full supply water pressure in pipes 106 and 127 through a range up to 16 times the pressure on the bottom of the large diaphragm.

A pipe 141 connected to the supply main 103 is provided with a needle valve 142 which admits full pressure water to pipe 121 at junction 143. At one side thereof is a tell-tale ball valve 144 provided with a glass casing, Figures 13 and 14, through which the passage of water to the feed chamber through feeler pipe 121 may be observed. The amount so diverted to said chamber is relatively small and such as to exert no appreciable addition either to the water content of the material under treatment or to the actual feed pressure in the feed box or chamber 23. The ball valve 144 also opposes accidental back flow through pipe 121 which would, depending on pressure conditions in feed chamber 23, tend to plug the discharge end of said pipe.

At the other side of junction 143 is a needle valve 145 regulatable to admit a small amount of water at approximately the stuff feed pressure into the space below the large diaphragm of compensator 115. Co-operating with valve 145 is another needle valve 146 which can be throttled to produce in said space below the large diaphragm any desired pressure between said feed pressure and zero, the discharge side of said valve 146 being provided with a waste outlet 147. By regulating said valves 145 and 146, the compensator and related devices can be set to cause the delivery of shoe pressures through pipe 127 at any desired or practical ratio of feed pressure to shoe pressure. Accordingly, when the feed pressure increases or decreases in feed chamber 23, the shoe pressure varies in the same direction by the established ratio, subject of course, to any differential or differentials as between different shoes or different groups of shoes due to settings of the several valves 116, or 107, if such be used. It will be apparent that this shoe pressure control mechanism not only affords effective means for automatically controlling the extent and/or character of treatment of the stuff or stock but also constitutes a safety device whereby, in case the supply of stock should fail in the feed box or inlet chamber 23, pressure on the shoes will be automatically relieved, thus protecting the stock and avoiding burning, scoring and/or other damage to the rotor.

In the arrangement shown in Figure 13, the needle valve or other regulating or reducing device may be omitted from pipe 148 if desired to insure delivery of the maximum pressure to the last group of shoes d and permit any desired gradient of differential pressures to be applied to the remaining or other groups of shoes. An advantage thereof is that, in the treatment of some stuffs, the material will beneficially take higher pressures as the treatment progresses from one shoe or set of shoes to the next. In case a regulating valve or the like is included in the pressure line 148 serving the last group of shoes, a gauge 149 is supplied to indicate the compensator output pressure.

For most efficient operation, apparatus of the kind described will preferably be supplied with stuff by feed mechanisms capable of delivering the material into feed chamber 23 at a substantially constant pressure. Means are also provided for adjusting such devices to feed stuff substantially constantly at different pressures within a suitably wide range. These controls relate particularly to the mill capacity or rate of throughput. So far as the feed pressure is regulatable over a wide range, the mill capacity is widely flexible and capable of satisfying different volume demands; and so far as the controls maintain a given pressure substantially constant, the capacity or throughput remains substantially uniform. In the refining, finishing or wetting of wood pulp, for example, these features are especially important, both in actual production and in their relation to economy in plant equipment.

As shown in Figure 18, stock is fed to the mill inlet from a supply chest 201 through a stock supply conduit 151 by means of a suitable pump 152. A gauge 153 registers pressure in said conduit which includes a T section 154 having one outlet opening toward the mill and another toward a return conduit 155 positioned to discharge into chest 201. A Feeney type return control or regulator is interposed in the return line. One form thereof includes a valve plug 156 mounted on a lever 157 pivoted at 158 and having removable weights 159 suspended at its free end. In operation, with a given calibration and setting of the parts described, stuff is forced upwardly through conduit 151 by pump 152. A sufficient amount thereof to substantially maintain the predetermined feed pressure is forced into the feed box or chamber of the mill. Any excess of pressure, causes overflow or return of stock past valve plug 156. As will be readily understood, the feed pressure in conduit 151 is increased by adding weights to 159 and diminished by removing weights therefrom.

For automatically regulating the feed pressure of stocks having the properties of sulphite pulp, for example, particularly where the consistency is 3½% or higher, a positively actuated control valve affords superior certainty in operation. As shown in Figure 19 and as disclosed in the co-pending application of James T. Coghill, Serial No. 717,719, filed March 28, 1934, a T section 160 is interposed in conduit 151, one arm of said section providing an opening 161, Figure 20, into the stock return conduit 155. In a preferred embodiment, said opening 161, Figure 20, is square in shape and provided with a suitable gate 162 movable across said opening and actuated by a piston rod 163 of a piston 164 mounted in cylinder 165. An opening 166 admits fluid under pressure into said cylinder at one side of said piston and another opening 167 admits fluid under pressure at the other side thereof. In the device shown, the valve including gate 162 produces an effective area of the opening 161 which varies as the square of the extent of gate movement, thus adapting the construction for efficient operation when handling both large and small quantities of by-passed stock.

To produce feed controlling movement of said gate 162, a supply of fluid under pressure is admitted to the cylinder through opening 166 by a pipe 168 and through opening 167 by a pipe 169, the direction of flow or pressure through said pipes being controlled by pilot valve 170 having a waste vent 171 and a supply inlet pipe 172. The neutral position of the ports in pilot valve 170 is determined by the position of a balance beam 173 pivoted at 174 and having a slidable weight 175. A fulcrum 176 is arranged with one end engaging the underside of beam 173 and the other end resting on the diaphragm 177 extending across a chamber 178 which is connected by a pipe 179 to the feed pressure feeler line 121 where the apparatus includes automatic shoe pressure control, Figure 13, or, as shown in Figure 19, directly to the feed pressure chamber 23. In the latter case, a needle valve 180 admits a suitable supply of water to said pipe 179 from the water main 181 to prevent clogging by stuff in the feed chamber.

In operation, the position of weight 175 along beam 173 will be set to maintain any desired feed pressure, indicated for example by a gauge 182. If the feed pressure rises, diaphragm 177 moves up and in so doing raises the free end of beam 173. A link or stem 183 connects said beam with the moving part of pilot valve 170 so that when beam 173 moves upwardly supply water under pressure is admitted through a port of valve 170 to pipe 168 which opens gate 162, thus allowing a sufficient amount of stock to by pass through opening 161 to restore the balance between the weighted beam and the feed pressure. If the feed pressure falls below the balanced value, adjustment in the opposite sense is effected. With the arrangement above described any predetermined suitable feed box pressure may be automatically and positively maintained within a satisfactory range of variation. The extent of movement of the free end of beam 173 may be limited by adjustable stops 184 and 185. A pin 186 projects from the beam laterally and in position to be engaged with a cam action by a curved portion of one arm 187 of a lever pivoted at 188, the other arm 189 being provided with a weight which in one position locks the beam out of operation, and in the other permits the beam to move freely between the stops 184 and 185.

Of the various novel and useful constructions and embodiments herein above described and shown in the drawings, the subject matter jointly invented by us relates more particularly to the removal of trash, to control of the degree of character of stuff treatment by automatically controlling pressure in the shearing gap or treating zone in response to feed pressure variations, and to maintenance automatically of a predetermined quality or state of the product by said zone or gap pressure control combined with appropriate devices for maintaining an approximately constant feed pressure.

In starting a run on a machine provided with said control features, the feed pressure control is set to deliver to the feed chamber a volume of material at the required pressure. Valve 105 is turned to the pressure supplying position shown, Figure 13, and the shoes, one by one or group by group as needed or desired, are moved toward effective stuff treating position with uniformly or differentially increasing pressure, depending on the setting of the differential controls, until the feed box pressure reaches the predetermined value fixed by the setting, at which point a balance is established between feed pressure and shoe pressure as previously explained. If inspection of the product shows that the stock needs more or less treatment, the result may be reached by suitably regulating valve 146, for example, by adjusting any or all of the differential regulating valves related to the several pipes leading to the shoes, or in any other manner which will increase or diminish the energy expenditure on the stock in process of treatment. The controls will then, of course, operate to automatically maintain the new conditions of treatment.

We claim as our invention:

1. In a stuff treatment machine, the combination of a rotor and a stator operatively arranged in relation to a peripheral surface of said rotor to form a treatment zone between them, means for delivering material to and confining it in a feed chamber under pressure and in contact with a portion of said peripheral surface of the rotor in advance of the stator, means for actuating the rotor to move suitably sized particles of said material into said treatment zone, means positioned and adapted to accumulate other particles at one side thereof in said feed chamber, a trash outlet for said accumulated particles, and a valve operatively arranged between said feed chamber and said trash outlet to intercept said other particles when closed and to pass said other particles when open.

2. Apparatus according to claim 1 and wherein the valve is provided with a gate which is normally closed by pressure of material against it and means are provided for moving said gate against said pressure to open it.

3. Apparatus according to claim 1 and wherein the valve includes a gate and a port and the gate is pivotally mounted between the inlet end of the treatment zone and said trash outlet.

4. Apparatus according to claim 1 and wherein a passageway connects the feed chamber with said trash outlet and a valve gate is arranged to extend across said passageway when in closed position.

5. Apparatus according to claim 1 and wherein a passageway connects the feed chamber and said trash outlet, and the valve includes a rotatable gate which is disposed across said passageway to control the movement of said accumulated particles to the trash outlet.

6. Apparatus according to claim 1 and wherein the accumulating means includes a deflector which is positioned in advance of the stator for deflecting unsuitably sized particles from the inlet end of the treatment zone toward said valve.

7. Apparatus according to claim 1 and wherein the rotor periphery is provided with transverse grooves and the material delivering means includes devices for feeding the stuff to be treated, including particles small enough to be admitted to the treatment zone and other particles which are too large, against said rotor grooves, and the accumulating means are positioned to intercept the too large particles and accumulate them in position to be discharged when the trash valve is opened.

8. In a stuff treatment machine, the combination of a stator and a rotor arranged to form a shearing gap between them, means for feeding material in a fluid medium and under pressure into a feed chamber and into contact with a peripheral portion of the rotor at the inlet end of said gap, means for actuating the rotor to move suitably sized particles of said material out of said chamber into said gap, means adapted to accumulate other particles in the chamber at one side of the gap, a discharge port for said accumulated particles, and a valve operatively arranged between said inlet end of the gap and said discharge port to intercept said other particles when closed and to pass said other particles when open.

9. Apparatus according to claim 8 and wherein the valve is mounted to be normally closed by pressure of material against it and means are provided for moving said valve against said pressure to open it.

10. Apparatus according to claim 8 and wherein the valve is pivotally mounted between the inlet end of the gap and said discharge port.

11. Apparatus according to claim 8 and wherein a passageway connects the feed chamber with said discharge port and the valve gate is arranged to extend across said passageway when in closed position.

12. Apparatus according to claim 8 and wherein a passageway connects the feed chamber and said discharge port, and the valve includes a rotatable gate which is disposed across said passageway to control the movement of said accumulated particles toward the discharge port.

13. Apparatus according to claim 8 and wherein the accumulating means includes a deflector which is positioned in advance of the stator and extends into the feed chamber to deflect unsuitably sized particles from the inlet end of said gap toward said valve.

14. In apparatus for stuff treatment, the combination of a rotor, a stator operatively arranged in relation to a peripheral surface of the rotor to form a film shearing gap, means for delivering stock comprising material in a fluid medium under pressure to the inlet end of said gap, means for subjecting a film of said stock simultaneously to pressure and film shearing action in the gap, means for regulating said gap pressure, and means operatively connected to said stock delivering means and responsive to pressure variations therein for automatically controlling operation of said gap pressure regulating means.

15. Apparatus according to claim 14 and wherein the means for subjecting the film of stock to pressure in the gap includes means for applying pressure to the stator and means for regulating said pressure.

16. Apparatus according to claim 14 and wherein the film pressure in the gap is regulated by means for applying controllably adjustable fluid pressure to the stator.

17. Apparatus according to claim 14 and wherein the means for regulating the gap pressure includes the stator, means for applying fluid pressure to said stator, and means connected to and controlled by said pressure responsive means for adjusting said fluid pressure applied to the stator.

18. Apparatus according to claim 14 and wherein the means for regulating the gap pressure includes the stator, means for applying fluid pressure to said stator, and means connected to and controlled by said pressure responsive means for adjusting said fluid pressure applied to said stator and wherein said pressure responsive means includes a fluid pressure supply line connected to the stator, a compensator valve in said supply line and a feed pressure feeler line connected to the stock delivering means and to said compensator valve.

19. In stuff treatment apparatus, the combination of a rotor, a plurality of stator units operatively arranged in relation to a peripheral surface of the rotor to form a film shearing gap, each of said units including a pressure cylinder, a piston and a shoe mounted on the piston, means for supplying fluid pressure to said shoes, means for independently regulating the amount of fluid pressure to each shoe, means for simultaneously adjusting the pressure supplied to all of said shoes, means for feeding material under pressure to the inlet end of said shearing gap, and shoe pressure control means connected to said material feeding means and responsive to variations therein to regulate the pressure supplied to all of said shoes.

20. Apparatus according to claim 19 and wherein means are provided for moving each shoe toward and from the shearing gap independently of said shoe pressure supplying and controlling devices.

21. In stuff treatment apparatus, the combination of a rotor and a stator operatively arranged in relation to a peripheral surface of said rotor to form a film shearing gap between them, means for feeding material in a liquid medium and under pressure to the inlet end of said gap, means for moving said stator toward and away from said peripheral surface of the rotor, and means for controlling said stator moving means to move the stator toward the rotor in response to an increase in feed pressure of the material and to move said stator away from the rotor in response to decrease in said feed pressure.

22. In a stuff treatment machine, the combination of a rotor and a stator operatively arranged in relation to a peripheral surface of said rotor to form a treatment zone between them, means for delivering material to said treatment zone under pressure, means for actuating the rotor to move suitably sized particles of said material into and through said treatment zone, means positioned and adapted to accumulate other particles at the inlet side of said zone, a trash outlet for said other particles, a valve operatively arranged to intercept said other particles when closed, and means for opening said valve to discharge said other particles from the inlet side of said treatment zone to said trash outlet.

23. Apparatus according to claim 22 and wherein the valve is provided with a gate which is normally closed by pressure of material against it and means are provided for moving said gate against said pressure to open it.

24. Apparatus according to claim 22 and wherein the valve includes a gate and a port and the gate is pivotally mounted between the inlet end of the treatment zone and said trash outlet.

25. Apparatus according to claim 22 and wherein a passageway connects the material delivering means with said trash outlet and a valve gate is arranged to extend across said passageway when in closed position.

26. Apparatus according to claim 22 and wherein a passageway connects the material delivering means and said trash outlet, and the valve includes a rotatable gate which is disposed across said passageway to control the movement of said accumulated particles to the trash outlet.

27. Apparatus according to claim 22 and wherein the accumulating means includes a deflector which is positioned in advance of the stator for deflecting unsuitably sized particles from the inlet end of the treatment zone toward said valve.

28. Apparatus according to claim 22 and wherein the rotor periphery is provided with transverse grooves and the material delivering means includes devices for feeding the material to be treated, including particles small enough to be admitted to the treatment zone and other particles which are too large, into said rotor grooves, and the accumulating means are positioned to intercept the too large particles and accumulate them in position to be discharged when the trash valve is opened.

29. In a stuff treatment machine, the combination of a stator and a rotor arranged to form a treatment zone between them, means for feeding material in a fluid medium and under pressure including a feed chamber opening upon a peripheral portion of the rotor at the inlet end of said zone, means for actuating the rotor to move suitably sized particles of said material out of said chamber into said treatment zone, means adapted to accumulate other particles in the chamber at one side of the gap, a discharge port for said accumulated particles, and a valve operatively arranged between said inlet end of the gap and said discharge port to intercept said other particles when closed and to pass said other particles when open.

30. Apparatus according to claim 29 and wherein the valve is mounted to be normally closed by pressure of material against it and means are provided for moving said valve against said pressure to open it.

31. Apparatus according to claim 29 and wherein the valve is pivotally mounted between the inlet end of the gap and said discharge port.

32. Apparatus according to claim 29 and wherein a passageway connects the feed chamber with said discharge port and the valve gate is arranged to extend across said passageway when in closed position.

33. Apparatus according to claim 29 and wherein a passageway connects the feed chamber and said discharge port, and the valve includes a rotatable gate which is disposed across said passageway to control the movement of said accumulated particles toward the discharge port.

34. Apparatus according to claim 29 and wherein the accumulating means includes a deflector which is positioned in advance of the stator and extends into the feed chamber to deflect unsuitably sized particles from the inlet end of said gap toward said valve.

35. In apparatus for stuff treatment, the combination of a rotor, a stator operatively arranged in relation to a peripheral surface of the rotor to form a treating zone, means for delivering material in fluid form or in a fluid medium under pressure to said treating zone, means for subjecting said material to pressure in the treating zone, means for regulating said treating zone pressure and means operatively connected to said material delivering means and responsive to pressure variations therein for automatically controlling operation of said zone pressure regulating means.

36. Apparatus according to claim 35 and wherein the means for subjecting the material to pressure in the treating zone includes means for applying pressure to the stator and means for varying said pressure.

37. Apparatus according to claim 35 and wherein the pressure in the treating zone is regulated by means for applying controllably adjustable fluid pressure to the stator.

38. Apparatus according to claim 35 and wherein the means for regulating the treating zone pressure includes the stator, means for applying fluid pressure to said stator, and means connected to and controlled by said pressure responsive means for adjusting said fluid pressure applied to the stator.

39. Apparatus according to claim 35 wherein the means for regulating the treating zone pressure includes the stator, means for applying fluid pressure to said stator, and means connected to and controlled by said pressure responsive means for adjusting said fluid pressure applied to said stator, and wherein said pressure responsive means includes a fluid pressure supply line connected to the stator, a compensator valve in said supply line and a feed pressure feeler line connected to the material delivering means and to said compensator valve.

40. In stuff treatment apparatus, the combination of a rotor, a plurality of stator units operatively arranged in relation to a peripheral surface of the rotor to form therewith a treating zone, each of said units including a cylinder, a piston therein and a shoe mounted on the piston, means for supplying fluid pressure to actuate said shoes, means for independently regulating the amount of fluid pressure to each shoe, means for simultaneously adjusting the pressure supplied to all of said shoes, means for feeding material under pressure into said treating zone, and shoe pressure control means connected to said material feeding means and responsive to variations therein to regulate the pressure supplied to all of said shoes.

41. Apparatus according to claim 40 and wherein means are provided for moving each shoe toward and from the rotor independently of said shoe pressure supplying and controlling devices.

42. In stuff treatment apparatus, the combination of a rotor and a stator operatively arranged in relation to a peripheral surface of said rotor to form a treating zone between them, means for feeding material in liquid form or in a liquid medium and under pressure into said zone, means for moving said stator toward and away from said peripheral surface of the rotor, and means for controlling said stator moving means to move the stator toward the rotor in response to an increase in feed pressure of the material and to move said stator away from the rotor in response to decrease in said feed pressure.

43. In stuff treatment apparatus, the combination of a rotor, a stator positioned to form a treatment zone therewith, means for driving said rotor to carry material through said treatment zone, means for moving said stator toward and away from the rotor, means for supplying material to the treatment zone under pressure, and control means responsive to variations in feed pressure of the material and connected to the stator moving means to control actuation thereof.

44. In stuff treatment apparatus, the combination of a rotor, a stator positioned to form a treatment zone therewith, means for driving said rotor to carry material through said treatment zone, means for moving said stator in relation to the rotor, means for supplying material to the treatment zone under pressure, and control means responsive to variations in feed pressure of the material and connected to the stator moving means to control actuation thereof.

45. In stuff treatment aparatus, the combination of opposed material treating members mounted to form a treatment zone between them, means for moving one of said members toward and away from the other, means for supplying material to the treatment zone under pressure, and control means responsive to variations in feed pressure of said material and operatively connected to said moving means to control actuation of said moving means.

46. In stuff treatment apparatus, the combination of opposed material treating members including a stator and a rotor mounted with a treatment zone between them, one of said members being adjustable toward and away from the other of said members, means for feeding material under pressure to the treatment zone, and means responsive to variations in said feed pressure and operatively connected with said adjustable member and with said material feeding means to move said adjustable member in relation to the other member to vary the pressure on material in the treatment zone.

47. In stuff treatment apparatus, the combination of opposed material treating members including a stator and a rotor mounted with a treatment zone between them, one of said members being adjustable toward and away from the other of said members, means for feeding material under pressure to the treating zone including a conduit, a relief port connected thereto, and a valve controlling said port, means for moving said adjustable member to control pressure on material in the treating zone, and means for actuating said relief port valve, said moving means and said actuating means being connected to said conduit and operative in response to variations in feed pressure therein.

CHARLES P. TOLMAN.
JAMES T. COGHILL.